(12) United States Patent
Chen et al.

(10) Patent No.: US 9,736,456 B1
(45) Date of Patent: Aug. 15, 2017

(54) TWO DIMENSIONAL TO THREE DIMENSIONAL VIDEO CONVERSION

(71) Applicant: Pixelworks, Inc., Portland, OR (US)

(72) Inventors: Tao Chen, Shanghai (CN); Bob Zhang, Santa Clara, CA (US); Junhua Chen, Shanghai (CN); Ji Zhao, Shanghai (CN); Neil D. Woodall, Newport Beach, CA (US); James Zhou, San Jose, CA (US)

(73) Assignee: PIXELWORKS, INC., Portland, OR (US)

( * ) Notice: Subject to any disclaimer, the term of this patent is extended or adjusted under 35 U.S.C. 154(b) by 957 days.

(21) Appl. No.: 13/630,301

(22) Filed: Sep. 28, 2012

(51) Int. Cl.
*H04N 15/00* (2006.01)
*H04N 13/00* (2006.01)

(52) U.S. Cl.
CPC ............................... *H04N 13/0055* (2013.01)

(58) Field of Classification Search
CPC .................................................. H04N 13/0055
See application file for complete search history.

(56) References Cited

U.S. PATENT DOCUMENTS

| | | | | |
|---|---|---|---|---|
| 5,259,040 A | * | 11/1993 | Hanna ..................... | G06K 9/209 375/240.12 |
| 7,860,332 B2 | * | 12/2010 | Lim ..................... | H04N 5/23212 382/255 |
| 2006/0153471 A1 | * | 7/2006 | Lim ..................... | H04N 5/23212 382/255 |
| 2009/0027383 A1 | * | 1/2009 | Bakalash ............... | G06F 9/5044 345/419 |
| 2009/0116732 A1 | * | 5/2009 | Zhou ..................... | H04N 13/0029 382/154 |
| 2011/0032341 A1 | * | 2/2011 | Ignatov ............... | H04N 13/0033 348/51 |
| 2012/0007950 A1 | * | 1/2012 | Yang ..................... | H04N 13/026 348/43 |
| 2014/0035901 A1 | * | 2/2014 | Chen ..................... | G06T 13/40 345/419 |

OTHER PUBLICATIONS

S. Battiato, S. Curti, M. La Cascia, M. Tortora, and E. Scordato, "Depth map generation by image classification", Proceedings of SPIE, Three-Dimensional Image Capture and Applications VI 5302, pp. 95-104, 2004.

* cited by examiner

*Primary Examiner* — Chikaodili E Anyikire
(74) *Attorney, Agent, or Firm* — Marger Johnson

(57) ABSTRACT

A method of converting two-dimensional image data to three-dimensional image data includes dividing the image data into blocks, performing motion estimation on the blocks to produce block-based motion vectors, applying a global motion analysis and a local motion analysis to the block-based motion vectors to generate motion-based depth, applying a global image model and a local image model to the block-based motion vectors to generate image-based depth, and generating a three-dimensional view by fusing the motion-based depth and the image-based depth. Other conversion methods are also included.

11 Claims, 9 Drawing Sheets

TOP-FAR,
BOTTOM-NEAR

TOP-NEAR,
BOTTOM-FAR

BORDER-NEAR
CENTER-FAR

BORDER-FAR
CENTER-NEAR

TOP/BOTTOM -NEAR,
CENTER-FAR

TOP/BOTTOM -FAR,
CENTER-NEAR

LEFT/RIGHT – NEAR
CENTER-FAR

LEFT/RIGHT – FAR
CENTER- NEAR

LEFT-FAR
RIGHT-NEAR

LEFT-NEAR
RIGHT-FAR

TWO DIMENSIONAL TO THREE DIMENSIONAL VIDEO CONVERSION

BACKGROUND

With the increasing availability of three dimensional televisions, the demand for three dimensional content has also increased. Newly available three dimensional content does not fill the demand for the consumer market. Converting two dimensional (2D) content to three dimensional (3D) content can fill this growing need for high quality stereoscopic images. In addition, autostereoscopic displays are always in 3D mode, and the generation of 3D images from 2D content provides a more uniform 3D viewing experience.

Many methods exist for 2D-3D conversion. Many rely on depth maps. A depth map is an image that contains information about the distance of surfaces or objects in the scene from a particular viewpoint. Different viewpoints generate different depth maps. In their article, "Depth Map Generation by Image Classification," published in the Proceedings of SPIE, Three-Dimensional Image Capture and Applications (VI 5302, pp. 95-104, 2004) Battiato, et al., generated the final depth map by fusion of a depth map from image classification and depth map from a vanishing point. But this method does not provide the robust depth for video and is not suitable for implementation in hardware.

In their article, "A Real-Time 2-D to 3-D Image Conversion Technique Using Computed Image Depth," published in SID Digest of Technical Papers (32. 2 pp. 912-922, 1998), Murata, et al., propose an adaptive control between the Modified Time Difference (MTD) and the Computed Image Depth (CID) image. The MTD can take stereo-pair from the input image sequence but only handles simple horizontal motion. The CID calculates the depth of each part of the input 2D image with its contrast, sharpness, chrominance and composition. However, this method has issues on the transition between MTD and CID because it does not use interpolated images. This method also uses a simple motion model and cannot handle complex or vertical motion.

DETAILED DESCRIPTION OF THE EMBODIMENTS

Figure 1:
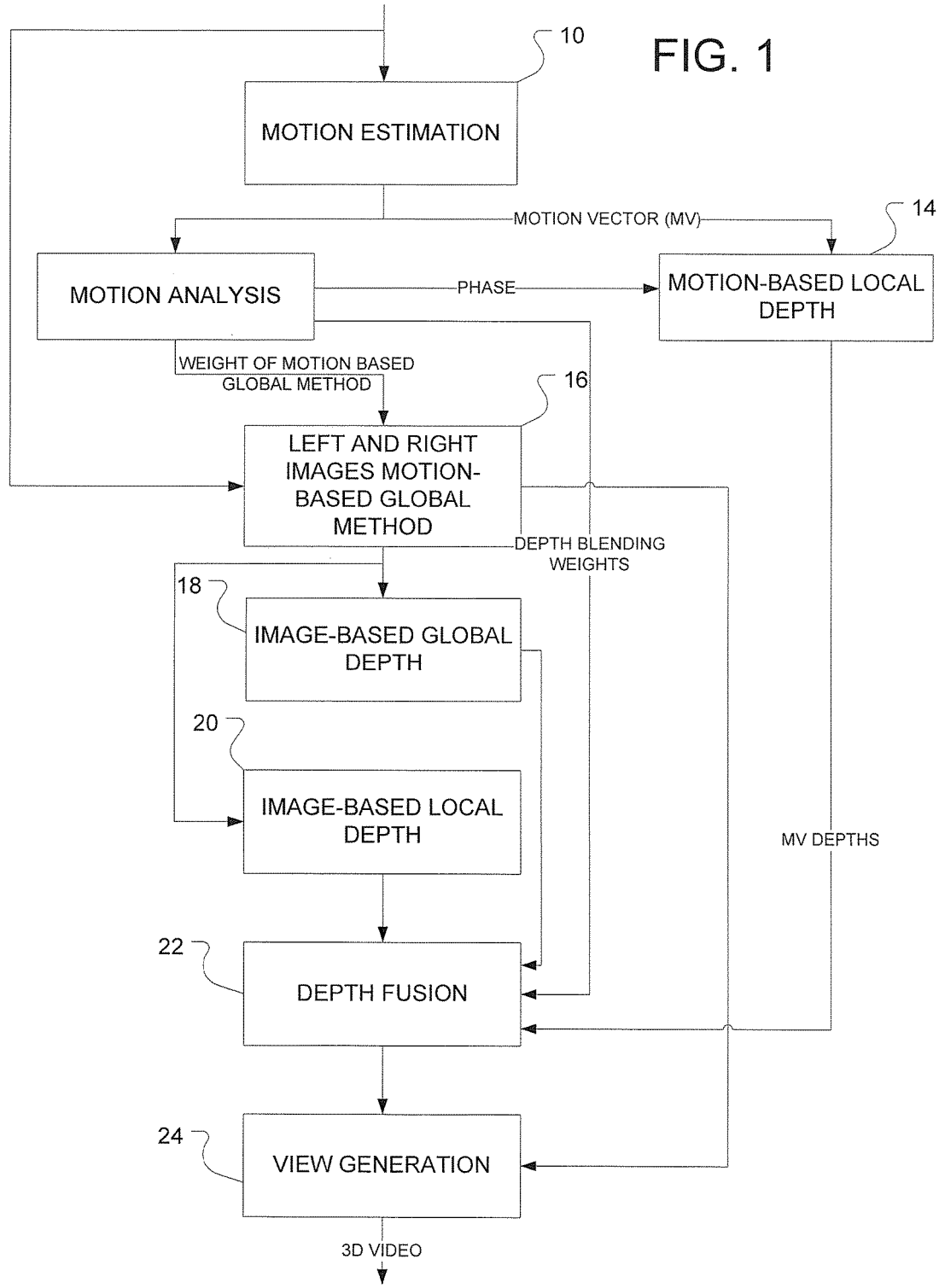
FIG. 1 shows a flowchart of an embodiment of a method of converting 2D content to 3D content.

FIG. 1 shows an embodiment of a method to use motion-based and image-based methods and integrate their results together to produce a robust depth measure used to general three-dimensional images from two-dimensional image data. The method employs both motion and image based methods for conversion of two-dimensional (2D) image data to three-dimensional (3D) image data.

In FIG. 1, motion estimation provides motion vectors from a current frame to a previous image based on two or more frames at 10. For each block, such as an 8×8 block of image data, a motion vector (MV) is calculated. Motion-based 2D-3D conversion analyzes MV fields and calculates depth for motion image sequences. The motion-based method includes a global method at 16 and a local, block-based, method at 14. The motion-based global method can cope with one-layer horizontal motion in which all objects move along same horizontal direction and there is no cover and uncover between different object, and two-layer horizontal motion in which foreground objects have the same motion direction relative to background. By performing motion analysis at 12, the weight of motion-based global method can be obtained. The temporal distance between the left-eye image and the right-eye image can be also calculated, and may not be an integer. If the distance is zero, the left-eye image and the right-eye image are the same and motion-based global method is invalid. In contrast, if the motion is simple horizontal motion, the weight of motion-based global method will be high.

When the motion is vertical motion or complex horizontal motion, the motion-based local method 14 will take action instead of motion-based global method. The idea of motion-based local method is to assign depth according to absolute difference between current block MV and the background MV. If the difference is large, the assigned depth will make the object appear nearer to the viewer. The weight of depth from local method is calculated in motion the motion analysis block at 12. The block-based MV depth will be decomposed to pixel level and fused with image-based pixel-wise depth further on in the process.

The image-based global method at 18 calculates the weights of several global depth models. The depth models are designed for different scenes, such as outdoors scene and indoor scene. High frequency information is used to recognize the scene. The weighted averaging of global depth models outputs the image-based global depth.

The image-based local method at 20 collects information of color, brightness and sharpness in local window to calculate the pixel-wise depth. The local depth is added into the pixel-wise global depth to obtain an image-based pixel-wise depth. The image-based depth and the block MV-based depth are fused at 22 to obtain the final depth map. The left-eye image and the right-eye image from the motion-based global method are adjusted based on the final fused depth map to obtain the 3D image.

In general, for a scene with motion, the motion-based conversion uses a global method or a local method according to the complexity of motion and the direction of motion. For still scenes, the image-based method generates depth from the adaptive global depth model and local pixel information. Motion estimation provides the block MV, for a block of a predetermined size, such as 8×8 or 16×16. The analysis of the block MV is used to recognize the scene property and output the weights of different methods. View generation outputs the converted 3D image and video.

Figure 2:
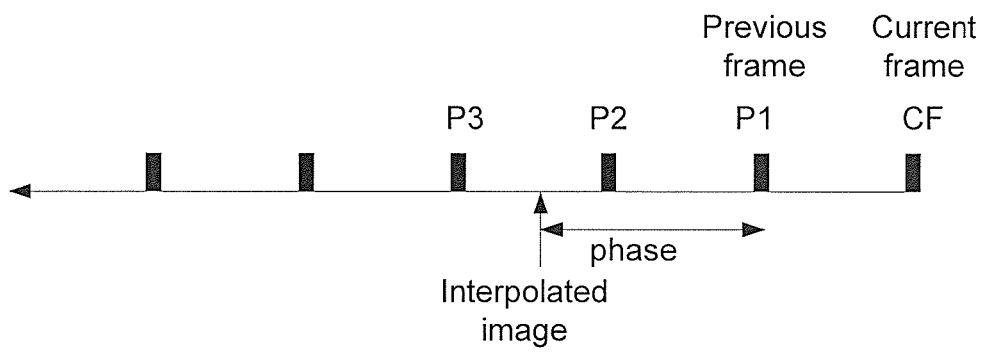
FIG. 2 shows an example of phase definition in a global motion-based method.

The original image or the interpolated image between two original images can be directly taken as the left-eye image or the right-eye image if the existing motion is simple horizontal motion. The conventional method just uses the original images as the left or right-eye images. However, the measurement of simple horizontal motion is not always 0 or 1, but is a value between 0 and 1. To ensure the robustness, the interpolated images are also necessary. The process classifies the simple horizontal motion into one of two classes: one-layer motion, also referred to as global pan, and two-layer motion, where the foreground has same motion direction relative to the background. Motion analysis discussed in more detail further will decide whether the motion belongs to the defined two-class motions, and will also output the phase of the left-eye image and the phase of the right-eye image. The phase is the distance between the current original frame and the interpolated image, which may be the left or right-eye image. FIG. 2 shows a pictorial representation.

The original frame may be the left-eye image or the right-eye image based on motion direction. If the phase is 0, there is no motion, and the motion-based methods would be invalid. The motion-based global method can generate two views. Because of implementation limits that only two consecutive original frames can be obtained at a time, the method cannot output these two views at one time. Therefore, it is only used for frame sequential 3D displays. The following operation will update them using the corresponding MV depth and image-based depth respectively.

If the motion is complex, the motion-based global method is not suitable. The foreground and the background can be separated based on the block MVs. As that is achieved, the depth of the background can be assigned to make it far to the viewer. The depth of the foreground can be assigned to make it near to the viewer. The key to the method is the recognition of the background. The calculated block MVs provide the enough information to make this recognition.

Figure 3:
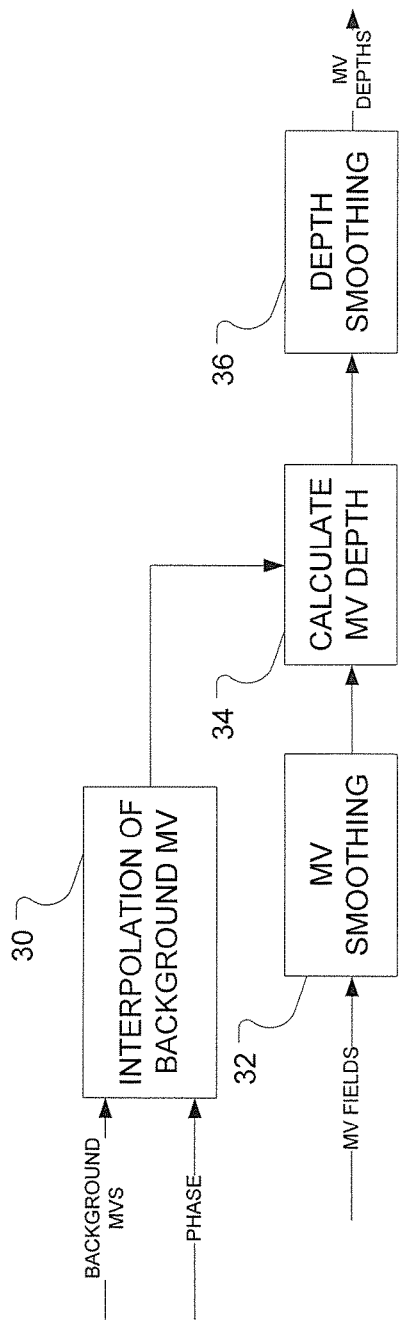
FIG. 3 shows an embodiment of a local motion-based method.

Motion-based local method first calculates depth (depth_mv) for each block using the current block MV (mv_blk) and the calculated background MV (mv_bg). The detail formula is as follows:

$$\text{depth\_mv} = F(\text{Mag}(\text{mv\_blk-mv\_bg})),$$

where Mag( ) means the magnitude of a vector, F( ) is a monotonic function, for example $y=k1*(k2*x)^{0.5}$, $k1>1$ and $0<k2<1$. To ensure the depth robustness, the input MV field is smoothed and the calculated block MV depth is also smoothed. FIG. 3 shows an embodiment of this process.

The background global MV and the phase for the block are used to interpolate the background MV for the block at 30. The motion vector field for the block is smoothed, typically by filtering at 32. The depth for the motion vector block is determined at 34 and the result is smoothed, again typically by filtering at 36. The result is the motion vector depths, shown in FIG. 1 as block 14.

The MV field of the interpolated frame can be generated either directly in the motion estimation process for each of the interpolated frames or is interpolated based on motion vectors associated with the two original frames used for interpolation. Because the background MV is just calculated for the original images, the background MV of the interpolated frames needs a weighted average of two background MVs of the original frames. Some integrated circuits (ICs) include a motion estimation and motion compensation (MEMC) circuit. The process is compatible with the motion vectors generated for motion estimation and compensation regardless of the final use of the motion vectors such as frame rate conversion or super resolution. When the motion vectors are generated for frame rate conversion, the generated motion vectors might be generated at the correct output phase or could be interpolated.

Figure 4:
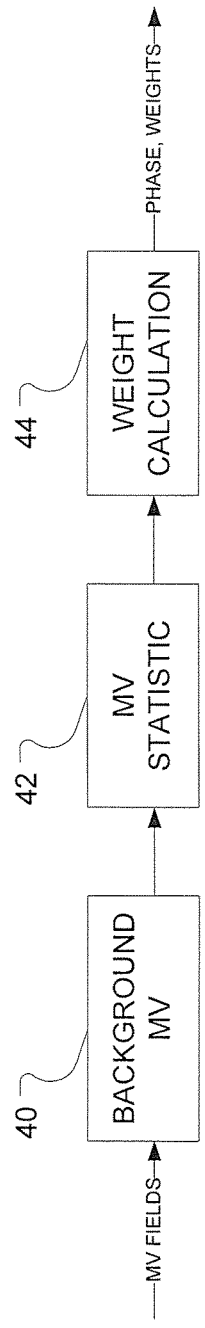
FIG. 4 shows an embodiment of a method of motion analysis.

Motion analysis receives the block MVs from motion estimation and calculates the weights of the proposed 2D-3D conversion methods. Its outputs include: the phase of left-eye image and the phase of right-eye image for motion-based global method; the weight of MV depth, which is the motion-based local method; and, the weight of image-based method. FIG. 4 shows an embodiment of a motion vector weight calculation. At 40, the background motion vector is determined.

Figure 5:
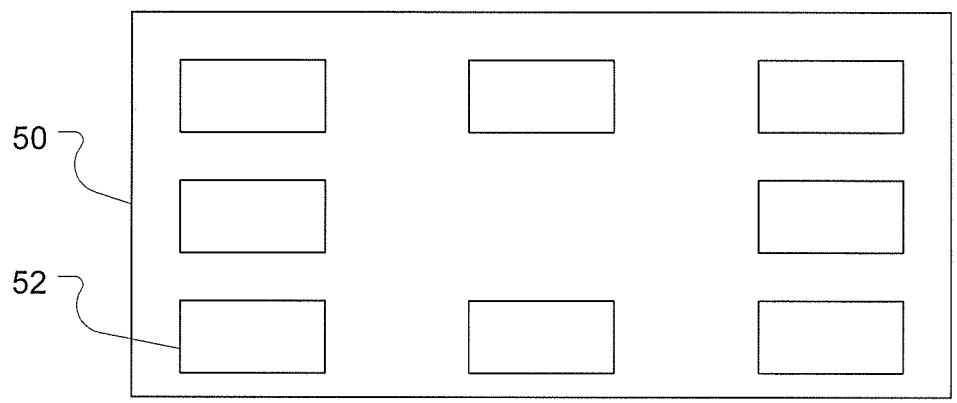
FIG. 5 shows an example of motion vector windows for background motion vector calculation.

For motion analysis, the background MV of the scene is a very important. The background MV can be calculated by an outside block and sent into 2D-3D conversion process. Alternatively, the background MV can also be calculated within the 2D-3D conversion process based on the estimated block MVs. First, the process calculates the average MV of all MVs of the current MV field. In the detailed implementation, the calculated average MV will be used for the next fame. Then the process takes 64 MVs from 8 programmable MV windows on the image as shown in FIG. 5 to calculate the background MV. In FIG. 5, the motion vector field is 50, with the programmable windows being represented by those such as 52. This discussion will just describe how to calculate the horizontal component of the background MV. The calculation of the vertical component is same. These 64 MVs are classified into 2 groups using the average MV of the previous MV field. Let avg_mvx denote the horizontal component of the average MV of the previous MV field. Two thresholds are calculated for MV classification:

$$\text{Th0\_mvx} = \text{avg\_mvx} + \text{delta},$$

$$\text{Th1\_mvx} = \text{avg\_mvx} - \text{delta},$$

where delta=min(7,max(1, k*avg_mvx), and $0<k<1$ is a parameter. These 64 MVs are classified into 2 groups. MVs with horizontal component no larger than Th0_mvx are classified into a group. MVs with horizontal component no less than Th1_mvx are classified into another group. Then we compare the MV numbers of two groups and select the group with the larger number. Finally, the average horizontal component of the selected MV group is calculated as the horizontal value of the background MV.

Figure 6:
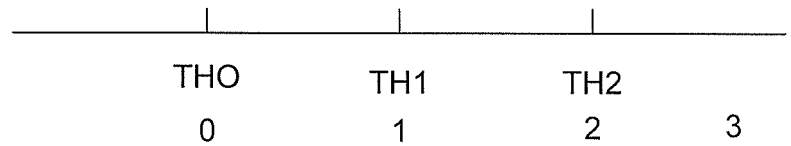
FIG. 6 shows a bin of a vertical motion vector histogram.

Returning to FIG. 4, after the background MV is calculated, the MV statistics are calculated at 42. In this embodiment, the vertical MV histogram and the horizontal MV histogram can be obtained. Vertical MV histogram has 4 bins as shown in FIG. 6. The number of MVs whose absolute vertical component is less than a threshold TH0 is stored in bin 0. Values of other bins can be similarly obtained.

Figure 7:
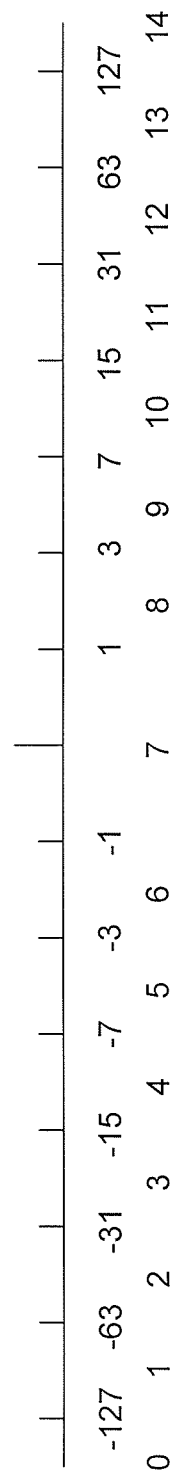
FIG. 7 shows a bin of a horizontal motion vector histogram.

The horizontal MV histogram is the difference between the horizontal component of background MV and block MV into the following histogram, shown in FIG. 7. If the difference is less than −127 for a given MV, the value 1 is put into bin 0. Returning to FIG. 4, once the process has horizontal and vertical histograms, it can obtain phases for the left-eye image and the right-eye image, the weight of MV depth and the weight of image depth at 44 as follows.

First, the process calculates the weight of motion to left, the weight of motion to right and the weight of vertical motion:

$$\text{Weight\_HL} = \Sigma a_i * \text{HistoH}[i], i=0\sim 6,$$

$$\text{Weight\_HR} = \Sigma a_i * \text{HistoH}[i], i=8\sim 14,$$

$$\text{Weight\_VertMt} = \Sigma b_i * \text{HistoV}[i], i=0\sim 3,$$

where HistoH is horizontal MV histogram, HistoV is vertical MV histogram, and $a_i$, $b_i$ are parameters and $a_i >= a_{i+1}$ for i=0~5, $a_i <= a_{i+1}$ for i=8~13, $b_i < b_{i+1}$ for i=0~2. The vertical motion statistic is used to lower the weight for the global model because vertical motion will create a vertical shift in the image between the left and right view and will feel uncomfortable to the viewer.

Next, the process calculates the possibility of horizontal opposite motion. Motion that is occurring in both directions does not follow the assumptions underlying the global model for calculating depth from motion. Therefore, the process needs to detect this case so that it can provide lower weight to the global motion model.

Weight_HOpp=min(Weight_HL, Weight_HR)−
    $k1$*max(Weight_HL, Weight_HR),

Weight_HOpp=min(1, max(0, Weight_HOpp)), where min,max denote minimal and maximal operation, and $0 <= k1 < 1$ is parameter.

Next, the process calculates the weight of global pan, one-layer motion, by the number of MVs close to background MV. The more the motion values are close to the background motion vector, the less important the horizontal opposite motion statistic becomes as Weight_Pan=$\Sigma c_i$*HistoH[$i$],$i$=6,7,8, where $c_i$ parameters. In addition, the weight is also calculated from the cover/uncover statistic on MV fields. A block will be hit if the center of a block in one frame is projected into another successive frame using its block MV. The MV of the hit block is called the projected MV. From each block in current frame, the measurement of cover/uncover between current frame and previous frame is calculated as follows:

max(0,|MV_cur−MV_prj1|−|MV_prj2−MV_prj1|), where MV_cur denotes motion vector of current block, MV_prj1 denotes projected MV from current block to previous frame using MV_cur, MV_prj2 denotes projected MV from hit block by MV_cur to current frame using MV_prj1, and |.| denotes the magnitude of a vector. Similarly, for each block in previous frame the measurement of cover/uncover between current frame and previous frame can also be obtained. The accumulated sum of the cover/uncover measurements in current frame and previous frame can is used to calculate the weight of one-layer motion. The larger the accumulated sum, the lower the weight.

Based on the above rules, the process obtains the weight and the phase of motion-based global method as follows:

Weight_MG=min(max(Weight_Pan, (1−Weight_
    HOpp)), (1−Weight_Vert$Mt$)),

Phase_MG=Weight_MG*Phase_Max, where Phase_Max is the max temporal distance defined by user. Based on the comparison of Weight_HL and Weight_HR, the process gets the phase of left-eye image and right-eye image:

PhaseL_MG=0, PhaseR_MG=Phase_MG, If
    (WeightHL>=Weight_HR);

PhaseR_MG=0, PhaseL_MG=Phase_MG, If
    (Weight_HL<Weight_HR).

The weight of motion-based local method is the following:

Weight_ML=1−Weight_MG.

If there is no motion in the scene, then the process gives more weight to the image based content method. The weight can be calculated as:

Weight_$I$=1−max(Weight_VertMt, Weight_HL,
    Weight_HR, $k2$*Mag(MV_BG)), where $0 < k2 < 1$ is a parameter and Mag( ) denotes the magnitude of the vector.

Figure 8:
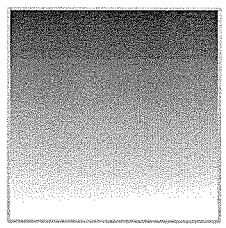
FIG. 8 show examples of different global depth models.
Figure 8:
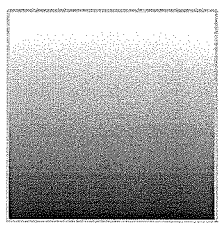
Figure 8:
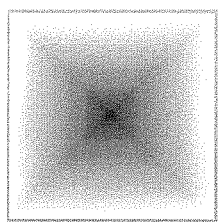
Figure 8:
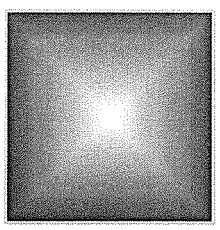
Figure 8:
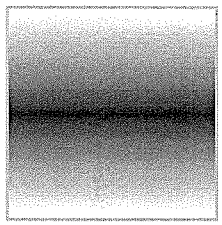
Figure 8:
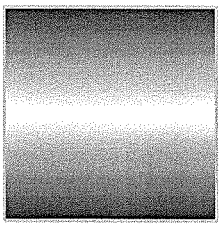
Figure 8:
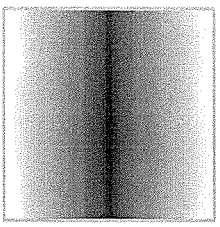
Figure 8:
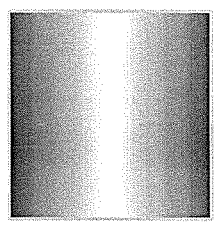
Figure 8:
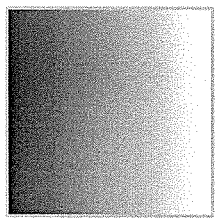
Figure 8:
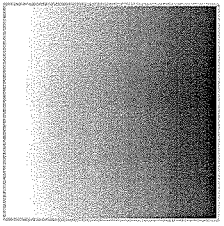

Having discussed the motion based methods, the discussion turns to image-based methods. The image-based 2D-3D conversion comprises of global method and local method. Global method returns the pixel-wise depth based on image structure recognition. Several global depth models can be pre-defined or automatically generated. FIG. 8 shows some examples of global depth models. Different global models correspond to different scene images. Analysis of image content recognizes the scene type and calculates the weight of each global depth model.

The process may evenly divide the input image into 4×8 (vertical-4, horizontal-8) regions. These regions can be overlapped or not. For each pixel, the process calculate the high-pass filtering value with the filter:

$$\begin{pmatrix} 1 & 1 & 1 \\ 1 & -8 & 1 \\ 1 & 1 & 1 \end{pmatrix}.$$

The average value of the filtering absolute value can be obtained in each region. The process denotes the value of all regions by HFArr[4][8]. The weights of global depth models can be calculated based on HFArr[4][8]. Row projection and column projection of HFArr can also be obtained as follows:

$$HFArr\_H[j] = \sum_{i=0}^{3} HFArr[i][j], j = 0, \ldots, 7,$$

$$HFArr\_V[i] = \sum_{j=0}^{7} HFArr[i][j], i = 0, \ldots, 3.$$

The basic rule of the weight calculation is monotonicity and symmetry of the array HFArr. The measurements of the vertical and horizontal monotonicity use the statistics shown below:

$$mdeltaV0 = \sum_{i=0}^{2}\sum_{j=0}^{7} \max(0, HFArr[i+1][j] - HFArr[i][j]),$$

$$mdeltaV1 = \sum_{i=0}^{2}\sum_{j=0}^{7} \max(0, HFArr[i][j] - HFArr[i+1][j]).$$

$$mdeltaH0 = \sum_{i=0}^{3}\sum_{j=0}^{6} \max(0, HFArr[i][j+1] - HFArr[i][j]),$$

$$mdeltaH1 = \sum_{i=0}^{3}\sum_{j=0}^{6} \max(0, HFArr[i][j] - HFArr[i][j+1]).$$

For simplicity, the measurements of the monotonicity can also be calculated by using the row and column projections: HFArr_H[8] and HFArrV[4].

For the array HFArr[4][8], the monotonicity from the left or the right to the center and the monotonicity from the top or the bottom to the center are measured in the following:

$$mdeltaVC0 = \sum_{j=0}^{7} \max(0, HFArr[1][j] - HFArr[0][j]) +$$

$$\sum_{j=0}^{7} \max(0, HFArr[2][j] - HFArr[3][j]),$$

$$mdeltaVC1 = \sum_{j=0}^{7} \max(0, HFArr[0][j] - HFArr[1][j]) +$$

$$\sum_{j=0}^{7} \max(0, HFArr[3][j] - HFArr[2][j]),$$

$$mdeltaHC0 = \sum_{i=0}^{3} \sum_{j=0}^{2} \max(0, HFArr[i][j+1] - HFArr[i][j]) +$$

$$\sum_{i=0}^{3} \sum_{j=4}^{7} \max(0, HFArr[i][j] - HFArr[i][j+1]),$$

$$mdeltaHC1 = \sum_{i=0}^{3} \sum_{j=0}^{2} \max(0, HFArr[i][j] - HFArr[i][j+1]) +$$

$$\sum_{i=0}^{3} \sum_{j=4}^{7} \max(0, HFArr[i][j+1] - HFArr[i][j]).$$

The measurements of the symmetry are calculated in the following:

$$symH = \sum_{i=0}^{3} \sum_{j=0}^{3} abs(HFArr[i][j] - HFArr[i][7-j]),$$

$$symV = \sum_{i=0}^{1} \sum_{j=0}^{7} abs(HFArr[i][j] - HFArr[3-i][j]).$$

The process denotes the weight of global model—"top-far, bottom-near" and "top-near, bottom-far" by weight_TB. Please note when the sign of the weight is positive, the global model—"top-far, bottom-near" is chosen, otherwise the global model—"top-near, bottom-far" is chosen. The weight is represented by vertical monotonicity:

$$weight\_TB = \begin{cases} \min(1, \max(0, mdeltaV0 - k\_tb * mdeltaV1)), & \text{if } mdeltaV0 \geq mdeltaV1 \\ -\min(1, \max(0, mdeltaV1 - k\_tb * mdeltaV0)), & \text{otherwise} \end{cases},$$

where k_tb>=1 is a parameter. In the same way, the weight of the global model—"left-far, right-near" and "left-near, right-far" can be obtained and denoted by weight_LR.

For example, 4×8 HFArr is $$\begin{pmatrix} 0 & 0 & 0 & 0 & 0 & 0 & 0 & 0 \\ 1 & 1 & 1 & 1 & 1 & 1 & 1 & 1 \\ 0 & 0 & 0 & 0 & 0 & 0 & 0 & 0 \\ 1 & 1 & 1 & 1 & 1 & 1 & 1 & 1 \end{pmatrix}.$$

The measurements of the vertical monotonicity can be obtained by:

$mdeltaV0=8+8=16$ $mdeltaV1=8$

The final monotonicity (weight_TB) is equal to zero if k_tb=2.

Similarly to weight_TB and weight_LR, let weight_LRC and weight_TBC denote the weight of global model—"left/right-far, center-near" and "left/right-near, center-far" and the weight of global model—"top/bottom-far, center-near" and "top/bottom-near, center-far". The weight_LRC is calculated by the following formula:

$$weight\_LRC = \begin{cases} \min(1, \max(0, monoHC0 - k1\_lrc * monoHC1 - k2\_lrc * symH)), & \text{if } monoHC0 \geq monoHC1 \\ -\min(1, \max(0, monoHC1 - k1\_lrc * monoHC0 - k2\_lrc * symH)), & \text{otherwise} \end{cases},$$

where k1_lrc>=1 and k2_lrc>=0 are parameters as is the same for weight_TBC. But weight_LRC and weight_TBC are not the final weight.

The process denotes the weight of global model—"border-near, center-far" and "border-far, center-near" by weight BC. The weight is also signed. If its sign is positive, the global model-"border-far, center-near" is chosen. The weight is calculated from the following formula:

$$weight\_BC = \begin{cases} \min(weight\_LRC, weight\_TBC), & \text{if } weight\_LRC, weight\_TBC \geq 0, \\ \max(weight\_LRC, weight\_TBC), & \text{if } weight\_LRC, weight\_TBC < 0, \\ 0 & \text{otherwise} \end{cases}$$

Then if the original values have same signs, weight_LRC and weight_TBC should be adjusted, such as:

weight_LRC=weight_LRC−weight_BC weight_TBC=weight_TBC−weight_BC.

For each weight, temporal filtering is used to ensure the robustness of the calculated global depth. Based on these adaptive weights from image content, the depth from image-based global method is obtained by the weighted averaging of all global depth models.

For more flexibility of image-based global depth, an 8(row)*16 look-up-table (LUT) is also used as global depth. The image is divided into 8*16 parts and each region is assigned a depth from LUT. The LUT is generated by software based on the region high frequency statistic HFArr [4][8] or other information that software can obtain. The depth from the LUT is decomposed into pixel level by bilinear interpolation of 4 surrounding depths: LUT_Depth

[i−1, j−1], LUT_Depth[i−1,j], LUT_Depth[i,j−1], and LUT_ Depth[i,j], where 1≤i≤7, 1≤j≤15.

Graphics detection is used to decide whether the current image is graphics. If the image content is graphics, the left-eye image and the right-eye image will be same and no 3D effect will occur. Weight_graph is the output of the sub-block. If weight_graph is equal to 1, the disparity between the left-eye image and the right-eye image will also be zero. Depth fusion will receive the weight and accordingly adjust the image-based depth.

Figure 9:
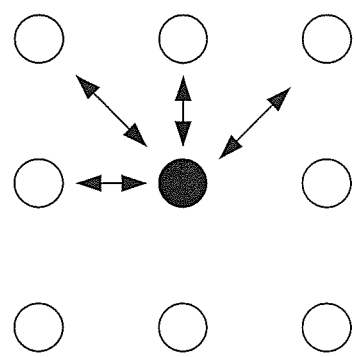
FIG. 9 shows an embodiment of statistical local difference.
Figure 10:
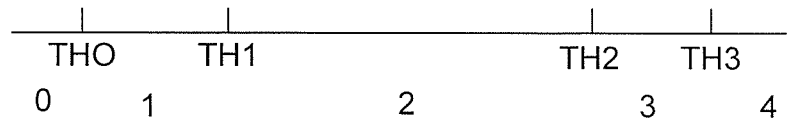
FIG. 10 shows a histogram of a local difference.

Graphics detection is as follows. First, the process calculates the absolute difference between current pixel and neighborhood pixels as shown in FIG. 9. Next, the process does 5-bin histogram statistics as shown in FIG. 10 using 4 thresholds. The histogram is normalized to [0,1]. Next, based on histogram calculate the weight of graphics or video. The basic rule of graphics detection is that graphics image has more pixels with very small local absolute difference and more pixels with very large local absolute difference. The basic calculation formulas are as follows:

weight_graph=$k$_graph[0]*max(0, hist_graph[0]−core_graph[0])+$k$_graph[1]*max(0, hist_graph[1]−core_graph[1]), −$k$_graph[2]*max(0, hist_graph[2]−core_graph[2])+$k$_graph[3]*max(0, hist_graph[3]−core_graph[3])+$k$_graph[4]*max(0, hist_graph[4]−core_graph[4])

weight_graph=min(1, max(0, weight_graph), where, hist_graph is 5-bin histogram of absolute difference, core_graph[0~4]>=0 and k_graph[0~4]>=0 are parameters, and k_graph[0]>k_graph[1], k_graph[4]>k_graph[3].

Figure 11:
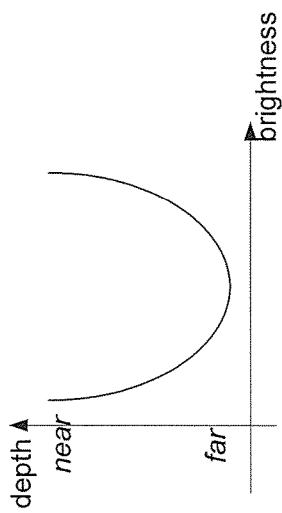
FIG. 11 shows a graph of local depth from brightness.

Image-based local depth is calculated from local pixel information, such as brightness, color and sharpness. If a pixel has high sharpness or high saturation, it is assigned a depth near to the viewer. FIG. 11 shows an example of local depth curve from pixel brightness. When the brightness of the pixel is very low or very high, the depth makes the object near to viewer. The depth from hue can be a programmable function of the distance between hue of current pixel and target hue. If the hue is equal to the target hue, the pixel has a depth far to the viewer. When the distance becomes large, the assigned depth becomes close to the viewer.

Figure 12:
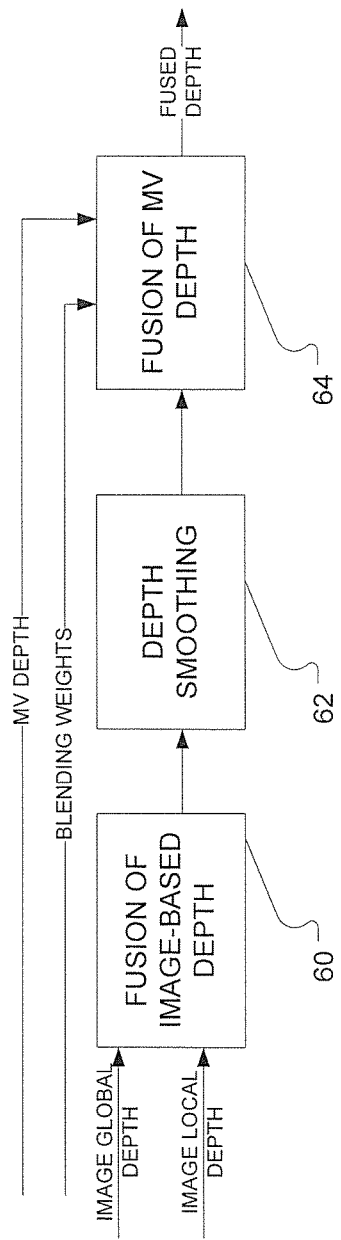
FIG. 12 shows an embodiment of depth fusion.

FIG. 12 shows the flow of depth fusion. At 60 the fusion process adds the local pixel depth into depth from global depth models to get the fused image-based depth. Low-pass filtering of depth at 62 produces the smoothed image depth. The low-pass filter can be averaging filter or Gaussian. In this embodiment, the process used two-window low-pass filtering because it has an advantage in preserving the depth edge between objects with large depth difference and to smooth the small depth error in an object. For example, let LPF_L and LPF_S denote filtering result in a large window and the filtering result in a small window, the result of two-window filtering is calculated from the following formula:

LPF_$w$=LPF_$S$+$w$*(LPF_$L$−LPF_$S$), where w ∈ [0,1] is a monotonic decreasing function of the absolute difference of LPF_L and LPF_S. Depth from motion-based local method is block-level MV-depth. It is first decomposed into pixel level by bilinear interpolation. Then the final depth is obtained by Depth=weight_ML*depth_mv+(1−weight_graph)*weight_I*depth_img, where, Weight_ML is the weight of MV depth and Weight_I is the weight of image-based depth, depth_mv is pixel-level MV depth, depth_img is fused image-based depth. The fused depth will be send to the block 24 in FIG. 1 to generate the 3D image/video.

Figure 13:
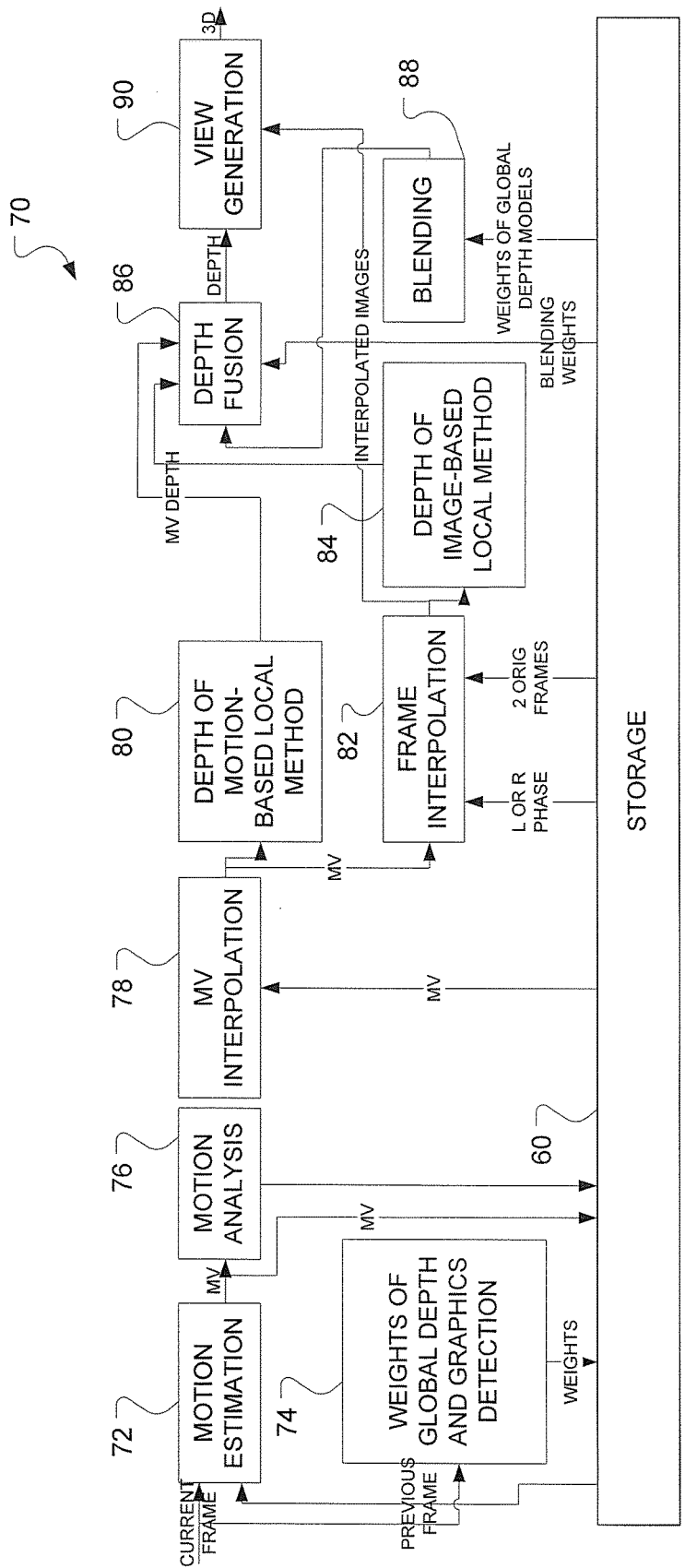
FIG. 13 shows an embodiment of hardware implementation of 2D-3D conversion.

FIG. 13 shows a hardware implementation of the 2D-3D conversion shown in flowchart form in FIG. 1. Image-based global depth method is separated into two parts: weights calculation of the global depth models and blending of the global depth models. The former calculates the weight of each global depth models on the original images. The latter blends the global depth models based on these weights. The weights require a weighted average based on the interpolation phase which may be a non-integer.

Motion estimation 72 and weights calculation of global depth models 74 work on the original frames. The video data, calculated MV and weights are stored. The later operations such as MV interpolation 78, depth of the motion-based local method 80, frame interpolation 84, and blending 88, fusion 86 and view generation 90 can obtain the data from the storage. Motion-based global method can output the left-eye image or the right-eye image using frame interpolation on their phases. Because of hardware limitations the method will be disabled if the left images and the right image are required at the same time.

In this manner, 2D image content can convert to 3D content in a robust manner using both motion and image content. It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of converting two-dimensional image data to three-dimensional image data, comprising:
    dividing the image data into blocks;
    performing motion estimation on the blocks to produce block-based motion vectors;
    applying a global motion analysis and a local motion analysis to the block-based motion vectors to generate motion-based depth;
    applying a global image model and a local image model to the block-based motion vectors to generate image-based depth, wherein the local image model collects color, brightness, and sharpness in a local window to calculate an image-based pixel-wise depth and applying the global image model includes:
        calculating weights for at least two different global depth models, wherein each global depth model is designed for a different type of scene; and
        combining the at least two different global depth models to produce a weighted average depth models; and
    generating a three-dimensional view by fusing the motion-based depth and the image-based depth.

2. The method of claim 1, wherein applying a global motion analysis and a local motion analysis comprises providing a weighting for the global motion analysis results and the local motion analysis based upon the motion vectors.

3. The method of claim 1, wherein applying a global motion analysis and a local motion analysis comprises:
    determining that motion is simple horizontal motion and applying global motion analysis; and
    classifying the simple horizontal motion into one-layer or two-layer motion.

4. The method of claim 1, wherein applying a global motion analysis and a local motion analysis comprises:

determining that motion is complex motion and applying local motion analysis;

calculating a background motion vector based on original image data;

using the background motion vector and a motion vector for each block to produce a depth for each block.

5. The method of claim 1, wherein applying a global motion analysis and a local motion analysis comprises determining that there is no motion in the image data and weighting the global motion analysis and the local motion analysis to zero.

6. The method of claim 1, wherein applying a global image model and a local image model comprises:

analyzing content of the image data to recognize a scene type;

adaptively weighing outputs of different global depth models based upon the scene type.

7. The method of claim 1, wherein applying a global image model and a local image model comprises:

determining a high frequency measure for each region of the image data; and using the high frequency measure to access a look up table to locate a depth for that region.

8. The method of claim 1, wherein applying a global image model and a local image model comprises applying a local image model based upon local pixel information.

9. The method of claim 8, wherein applying a local image model based upon local pixel information comprises analyzing at least one of brightness, sharpness, and color of a pixel.

10. The method of claim 1, wherein generating a three-dimensional view comprises fusing the motion-based depth and the image-based depth based upon the weightings.

11. The method of claim 10, wherein fusing comprises:

fusing local image-based depth into global image-based depth to produce a fused image-based depth;

decomposing block level motion based depth to pixel level motion based depth;

fusing the pixel level motion based depth with local motion based depth to produce a fused motion-based depth; and fusing the image-based depth and the motion-based depth to produce a fused depth; and using the fused depth to generate a three-dimensional image.

* * * * *